US012127513B2

(12) United States Patent
Putala

(10) Patent No.: US 12,127,513 B2
(45) Date of Patent: Oct. 29, 2024

(54) RAINWATER COLLECTION AND STORAGE UNIT WITH INTEGRATED VEGETABLE GROWING BEDS

(71) Applicant: Randolph John Putala, Nashville, TN (US)

(72) Inventor: Randolph John Putala, Nashville, TN (US)

( * ) Notice: Subject to any disclaimer, the term of this patent is extended or adjusted under 35 U.S.C. 154(b) by 175 days.

(21) Appl. No.: 17/889,763

(22) Filed: Aug. 17, 2022

(65) Prior Publication Data

US 2023/0075166 A1    Mar. 9, 2023

Related U.S. Application Data

(60) Provisional application No. 63/241,753, filed on Sep. 8, 2021.

(51) Int. Cl.
*A01G 31/02*    (2006.01)
*E03B 3/03*    (2006.01)

(52) U.S. Cl.
CPC ............ *A01G 31/02* (2013.01); *E03B 3/03* (2013.01)

(58) Field of Classification Search
CPC ...... A01G 31/02; A01G 31/06; A01G 27/001; A01G 27/003; A01G 27/005; A01G 27/006; A01G 27/02; A01G 9/022; A01G 9/023; A01G 9/027; A01G 9/0295; E03B 3/03; B65D 21/0235; B65D 90/023; B65D 25/16; B65D 11/18; B65D 9/12; B65D 7/24; B65D 21/02
See application file for complete search history.

(56) References Cited

U.S. PATENT DOCUMENTS

| | | | | |
|---|---|---|---|---|
| 9,521,811 | B2* | 12/2016 | Peterson | A01G 27/005 |
| 2009/0065504 | A1* | 3/2009 | Vos | A01G 27/06 |
| | | | | 220/367.1 |
| 2009/0212051 | A1* | 8/2009 | Liu | E03B 3/03 |
| | | | | 206/457 |
| 2018/0371725 | A1* | 12/2018 | Bristoll-Groll | E04D 13/0445 |
| 2021/0212276 | A1* | 7/2021 | Hersh | A01G 31/06 |

FOREIGN PATENT DOCUMENTS

| | | | | |
|---|---|---|---|---|
| CN | 105580660 A | * | 5/2016 | ............ A01G 27/02 |
| CN | 108575689 A | * | 9/2018 | |
| CN | 210177583 U | * | 3/2020 | |
| WO | WO-2020244329 A1 | * | 12/2020 | |

* cited by examiner

*Primary Examiner* — Trinh T Nguyen
(74) *Attorney, Agent, or Firm* — Luis Figarella

(57) ABSTRACT

The present invention relates to a device, system and a method associated with the rainwater collection, and specifically with a device that can be assembled in-situ and when inter-connected allows for the collection, storage and distribution of water along conjoined vegetable growing trays that are interconnected mechanically and hydraulically.

16 Claims, 14 Drawing Sheets ns
RAINWATER COLLECTION AND STORAGE UNIT WITH INTEGRATED VEGETABLE GROWING BEDS

CROSS-REFERENCE TO RELATED APPLICATIONS

This application claims priority to U.S. Provisional patent application Ser. No. 63/241,753 titled "Rainwater collection and storage unit with integrated vegetable growing beds", filed on Sep. 8, 2021 the disclosure of which is herein incorporated by reference in its entirety.

PATENTS CITED

The following documents and references are incorporated by reference in their entirety, Conrad Jr. (U.S. Pat. No. 9,867,340), Peterson (U.S. Pat. No. 9,521,811), Wood (W/O 2014/037747) Whetherby (EP 2479352) and Zhou (CN 111788961).

FIELD OF THE INVENTION

The invention relates to a device and a method for rainwater collection and storage unit with integrated vegetable growing beds, and specifically to a modular building block that when interconnected accomplishes the above.

DESCRIPTION OF THE RELATED ART

Currently, there are a number of solutions for rainwater collection and storage, but none of them combine the dual tasks of collecting water and growing food crops simultaneously. Some of these solutions attempt to attach to hydroponic or drip irrigation growing systems, but in virtually each case these are two separate units with two separate functions. In addition, each of these functions is performed independently, with little apparent symbiotic relationship between the process of collecting water and supplying that water pre-mixed with liquid nutrients to the plants.

These systems are fine as independent and separate functioning units, but they can typically be complex and require complicated connections and interface between the two functions. Such solutions as these fail to meet the needs of the industry because they are complex and cumbersome to set up and operate. Typically, their installation and use requires expert training and knowledge to effectively implement the solutions and achieve satisfactory and consistent results.

With many of the existing rainwater collection and storage devices on the market, the installer must have an existing source of rainwater—typically a gutter system on a house or other building. In few cases is the rainwater collection device an integral part of the actual storage unit, as it is in the proposed solution.

With many of the rainwater-fed plant growing systems, a complex array of pipes, pumps and separate water storage tanks is required to both collect the rainwater and supply it to the plants in the correct dosage at the correct times of day for maximum plant health and growth. This can often require human interaction with the unit at least twice per day—every day, 365 days a year—placing the burden of success on the reliability of worker presence at the correct times of day. Failure to complete the feeding/watering schedule as little as 2 or more times in a week could jeopardize the health and viability of the plants to successfully grow food.

Other solutions attempt to correct these shortcomings by offering add-on timers or computer-controlled valves to their plant watering solutions. However, because they are not integral to the actual growing unit, they are subject to disruption and human error such as disconnection of power or accidental dislocation of the unit due by workers moving about the area. As such, these solutions are similarly unable to meet the needs of the industry because the true need for rainwater collection and food growing systems is in under-developed countries and extreme poverty locations. It is not likely that the residents of these areas have extensive knowledge or training in plumbing and water storage. They typically will not have knowledge of setting up a hydroponic or raised-bed system for growing food. With the proposed system, the plant watering and feeding solution—as well as the pumps and operating timers and gauges—are all an integral part of the unit. Operation of the proposed unit is greatly simplified and easily taught, so incidents based on worker skills or lack of skills are not likely to occur.

Still, other rainwater collection and storage solutions seek to use large and expensive plastic or steel tanks, either above ground or buried in the ground. These solutions fail to meet industry needs because the tanks are very costly to manufacture, and due to their large size, shipping—delivery—and installation—can all be difficult and costly. Many of the world's most under-developed and poverty-stricken areas are in very remote places. Moving a tank to hold over 1,300 gallons of is simply expensive. What is needed, is a way to assemble (even build) the components for such a system in-situ at a low cost.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a water collecting module comprising: a bottom panel, a top panel and four or more wall panels, wherein each said panel has edge mechanical components that are complementary to those of their neighboring panel's edge, so as to form a contiguous solid edge, each said top panel has one or more openings and one or more of said wall panels has one or more openings. In another aspect said panel edge mechanical components are comprised of one or more of: hinge knuckles secured by a hinge pin, Snap-on edges. In yet another aspect a bladder conformal to said module's inside volume, wherein said bladder has at least one openings coaxial to one or more openings located on said top panel, and at least one opening coaxial with the opening on at least one said wall panel. In yet another aspect at least one said bladder opening has a plug, cap, hose, flow restrictor, drip hose, faucet, valve, spigot or similar component. In another aspect said module internal horizontal and vertical edges are made leak proof via the addition of mechanical or chemical components, forming a fluid holding internal volume, wherein said edge leak proof mechanical component include one of: silicone gel, AMP sealing or silicone model seals; and one or more of said top panel or said wall panels openings has a plug, cap, hose, flow restrictor, drip hose, faucet, valve, spigot or similar component.

In one aspect the invention is about a water collecting system comprising: two or more hydraulically connected water collection modules, each said water collection module comprised of: a bottom panel, a top panel and four or more wall panels wherein each said panel has edge mechanical components that are complementary to those of their neighboring panel's edge, so as to form a contiguous solid edge, each said top panel has one or more openings, one or more of said wall panels has one or more openings, each said water collection module's panel edge mechanical components are comprised of one or more of: hinge knuckles secured by a hinge pin, Snap-on edges and a water collection funnel, hydraulically connected to the top of one said water collection module. In another aspect one or more of said water collection modules is equipped with a bladder conformal to each said water collection module's inside volume and each said bladder has at least one openings coaxial to one or more openings located on each said water collection module's wall panel, wherein each said water collection module's bladder is hydraulically connected to at least one more water collection module's bladder and at least one said bladder opening has a plug, cap, hose, flow restrictor, drip hose, faucet, valve, spigot or similar component. In yet another aspect a tarpaulin is placed over all or parts of said assembly and tilted so that any rain runoff off said tarpaulin falls into said water collection funnel. In another aspect one or more pumps is hydraulically connected to said water collection hydraulic network. In yet another aspect one or more of said water collection modules is placed on top of four or more other said water collection modules, forming at least one terrace atop the lower modules and a fence is placed around the external edge at least one said terrace, forming a growth bed with one or more drip connections to the hydraulic network between collection modules.

In another aspect a tarpaulin is placed over all or parts of said assembly and tilted so that any rain runoff off said tarpaulin falls into said water collection funnel. In yet another aspect a fertilizer/nutrient mixing station is placed within the highest water collection module in hydraulic connection to said water collection module network. In another aspect one or more pumps is hydraulically connected to said water collection hydraulic network. In yet another aspect both a fertilizer/nutrient mixing station and one or more pumps are connected said water collection module network. In another aspect one or more of said water collection modules internal horizontal and vertical edges are made leak proof via the addition of mechanical or chemical components, forming a fluid holding internal volume, wherein said edge leak proof mechanical component include one of: silicone gel, AMP sealing or silicone model seals, wherein each said water collection internal volume is hydraulically connected to at least one more other water collection module's internal volume; and at least one or more of said water collection module's top panel or said wall panels openings has a plug, cap, hose, flow restrictor, drip hose, faucet, valve, spigot or similar component. In yet another aspect a tarpaulin is placed over all or parts of said assembly and tilted so that any rain runoff off said tarpaulin falls into said water collection funnel.

In another aspect one or more pumps is hydraulically connected to said water collection hydraulic network. In yet another aspect one or more of said water collection modules is placed on top of four or more other said water collection modules, forming at least one terrace atop the lower modules and a fence is placed around the external edge at least one said terrace, forming a growth bed with one or more drip connections to the hydraulic network between collection modules. In another aspect a tarpaulin is placed over all or parts of said assembly and tilted so that any rain runoff off said tarpaulin falls into said water collection funnel. In yet another aspect a fertilizer/nutrient mixing station is placed within the highest water collection module in hydraulic connection to said water collection module network. In another aspect one or more pumps is hydraulically connected to said water collection hydraulic network. In yet another aspect both a fertilizer/nutrient mixing station and one or more pumps are connected said water collection module network.

In one aspect, the invention is about sustaining life in the very poorest regions of the world. These are often very obscure locations far from the big cities where supplies are plentiful. These people have next-to-nothing to live on, no jobs, no income, no source of supplies to grow food. Many have given up hope. They are in the jungles of sub-Saharan Africa; they are in the mountains of Appalachia; they are throughout South America and Asia.

Of course, many non-profits and NGOs, plus major organizations like the United Nations Food and Agricultural Organization (FAO), OXFAM, UNESCO and many others, are making a genuine difference. But their work cannot reach all people of the world, all remote villages, all struggling communities in all nations. A more 'grass-roots' approach is needed, one that local people can embrace and share in. It should be simple to set up, simple to operate, and affordable to manufacture and deliver in quantities. And it should be an approach that does not require back-breaking work such as in a community garden. It should also be more dependable than an ordinary garden that is subject to failure due to heat, cold, bad weather or poor care. Output is another concern: a great amount of food is needed in these villages, so it should be high-yielding. And it should be ongoing and evergreen, able to feed a great number of people on an ongoing basis. And most of all, it should not require a burdensome amount of knowledge or skills to operate.

We believe that the proposed solution meets all of these needs, and does so in a very innovative way. In essence, our solution creates a local "oasis" of fresh potable water and food. It provides a systematic way to reliably grow extremely nutritious organic fresh greens, vegetables, herbs and even fruit—without the need for specialized skills, extensive training or book knowledge. It is a system that will continue to perform month-in and month-out with almost no effort or daily involvement required of the unit operators.

A key feature of the proposed solution is that it can be easily replicated by any organization anywhere in the world, using an industrial-sized 3D printer. Some custom components of the units, particularly the plastic bladders used in the water storage boxes, will have to be manufactured by a specialty vendor. It is anticipated that the expert companies that make the bags used in box wine, will be interested in serving this market. Other components will be purchased off-the-shelf for inclusion in the proposed unit.

Another key feature of the proposed solution is its transportation flexibility. It can be delivered to extremely rural locations, where there are often no roads leading to the target destination. To facilitate easy and economical delivery of the proposed unit, all components have been designed to be shipped flat. Every item needed to assemble and operate the proposed unit can be placed on a shrink-wrapped pallet and 'dropped in' by helicopter or even delivered to any coordinates using an industrial drone.

The inventors of the proposed unit believe that for ANY proposed solution to the world food and water crisis, it must be extremely simple. It must be simple in design, simple to operate, and simple to access. Our unit fulfills each one of these needs quite efficiently.

In another aspect, the invention is about enabling the raising of animals in remote regions of the world. These animals can include poultry such as chickens and turkeys. The rainwater collection and storage system will provide water to keep the animals hydrated. Plus, the rainwater can be used to drip-irrigate row crops for growing animal feed. Most of these plants are too big to grow in the unit's built-in growing trays. But having the water present to keep row crops alive is a benefit that many remote locations of the world do not currently enjoy.

Row crops that can be grown for animal fodder include:

"Coarse" grains (that is, not refined; only fit for animal feed).

"Feed" grains (suitable for animals only).

Fonio grain. This is a relative rare fast-growing variety of wheat that has amazing potential for Africa. Currently grown largely in Northwest African countries such as The Gambia, Burkina Faso, Guinea-Bissau, Ghana and others. The un-hulled grain is digested efficiently by cattle, sheep, goats, donkeys, and other ruminant livestock. It is a valuable feed for monogastric animals, notably pigs and poultry, because of its high methionine content. The straw and chaff are also fed to animals. Both make excellent fodder and are often sold in markets for this purpose. Indeed, the crop is sometimes grown solely for hay.

Tef, a quick-growing grain that can be used to make human food as well as animal feed.

"Panic Grasses" such as Afezu, Panicum Laetum, Kram-Kram (Cenchrus Biflorus) and many others.

The "Yakon Root" plant. It is native to the Andes of South America. It looks like a sweet potato, but it is actually more closely related to the Sunflower plant. It has been described as being like a fresh-picked apple with mild, sweet flavor reminiscent of watermelon. It can be fed to animals or humans; both love the taste. Children eat it like candy.

There are literally 100s of food plants whose seeds, leaves, beans and roots can be used as animal fodder. It is our believe that this unit can physically grow some of these plants—particularly the greens and root-based plants—or it can supply the water and nutrients to fill drip irrigation lines to grow row crops of these plants. In essence, everything that a farmer needs to feed and water animals in an isolated and remote area could be facilitated by one or more of these units. That, in and of itself, is a claim that that few inventions can make.

In yet another aspect, the invention is about the economic well-being of people in remote parts of the world. People who live in remote and underserved villages often have no source of income. The only income they have is what they can grow or make and sell to others to make money. Since the start of the Covid-19 crisis, the economy in Sub-Saharan Africa has gone largely off kilter. Without capital, few of these people can start a business let alone buy supplies to run it or pay a salary.

With this invention, we are putting a tool of capitalism into the hands of those who have needs and desires to succeed—but no system. With our invention, these aspiring entrepreneurs can grow as many as 630 organic gourmet carrots every 70 to 80 days. If he or she can sell those at a farmer's market for the equivalent of 50 cents per carrot, they will bring in almost $300 after expenses. That can be a huge amount of money to someone who previously had little to no income.

Gourmet greens, vegetables and fruit have always commanded a high price at market. With this invention, we are creating a way for villagers to not only grow enough food for their people to survive—we are giving them a tool for business. By working closely with chefs at restaurants in the nearest cities, the aspiring farmers can grow the exact varieties of crops the chef wants. They can form ongoing contracted business and not have to worry about covering everyday financial needs.

Another very promising business model using this invention involves natural or "Ayurvedic" medicine. This practice is used throughout China and much of Asia including Pakistan and India and many of the former Soviet republics. Plants were used as medicine by the Native Americans and many country doctors. The use of plants as medicine goes back to Hippocrates and before. So we are not introducing anything new here as far as the methodology of these plants' use.

Instead, we are introducing a system that will utilize ONLY THE BOTTOM 70% of Ayurvedic medicines that are deemed relatively safe. By this, I mean that we will not produce any medicines that have the potential to kill or injure someone if mis-used or mis-diagnosed. So the plants we grow will all be safe, by themselves or in any combination.

As a key component of this system, we will use existing proven recipes for common household ailments. These would be things like upset stomach, fever, allergies, women's health and much more. We will create a series of training videos and manuals explaining how to grow each plant, how to harvest and prepare them, and how to combine them with other plants and binders to prepare them for consumption. It is our goal that the women of a village establish this as a business and sell their potions and healing creams to people throughout their area. Many of the people in the remote villages of Africa rely on witch doctors and voodoo to treat ailments. Our goal here is to teach the people how to heal themselves.

Other features and advantages of the present invention will become apparent upon examining the following detailed description of an embodiment thereof, taken in conjunction with the attached drawings, which are provided for purposes of illustration and not of limitation.

Figure 1:
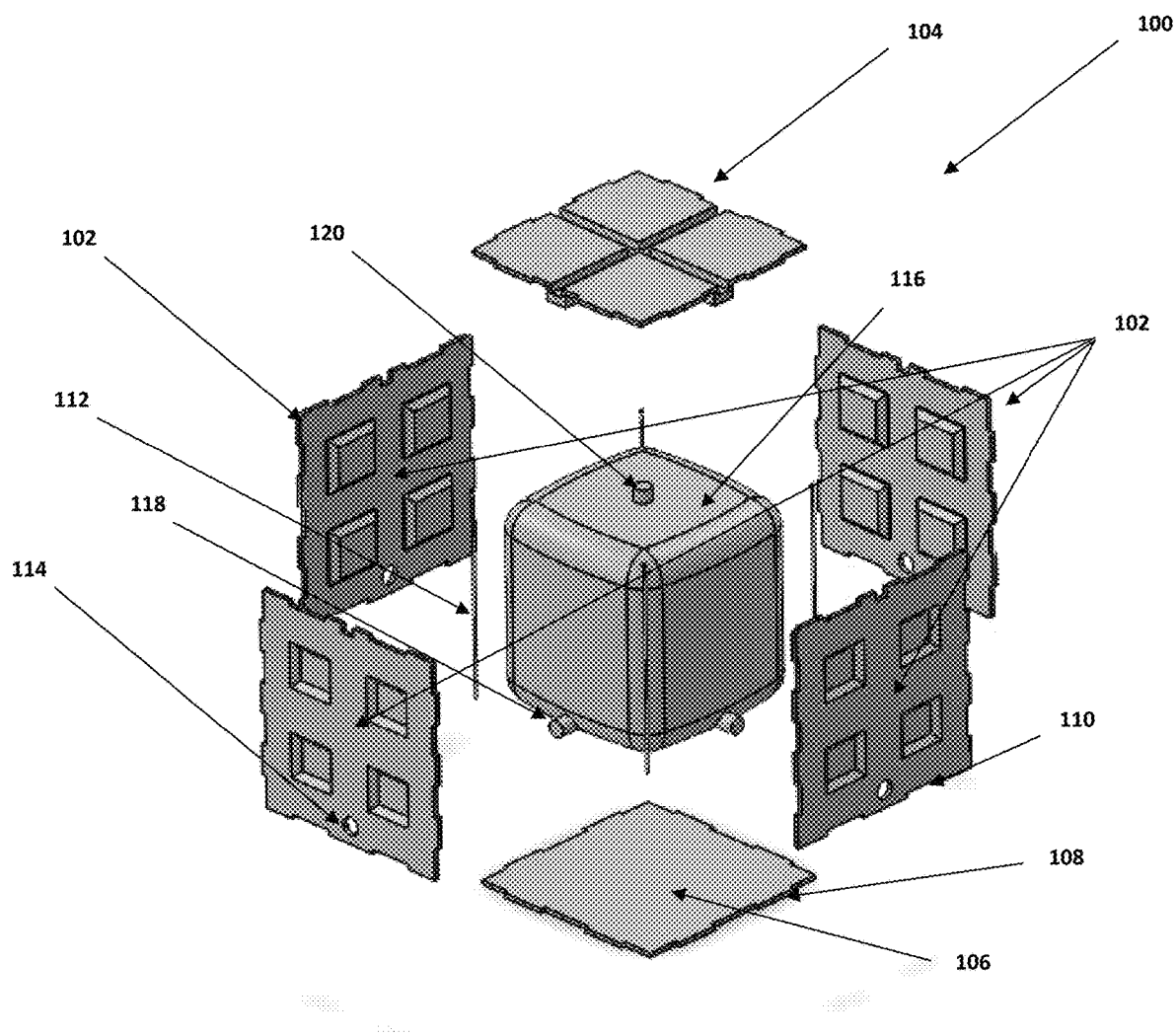
FIG. 1 shows the internal and external components that make up the basic water storage box component of the Rainwater Collection and Storage Unit, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

Every NGO or non-profit that has attempted to bring high-technology to remote locations will tell you that the problems are many. High tech solutions can be easily compromised by extreme weather conditions and lack of protection against the elements. And that is why we have designed the unit to be extremely rugged and using industry-best technology to assure a long service life with minimal need for maintenance and parts replacement.

Another one of the main concerns of bringing complex technology to remote areas is the skill sets and education of the local community. That is why the operation of the proposed solution is extremely simple. The unit can be easily operated and managed by a team of unskilled workers. Once the unit is assembled, tested and ready to use, the only key tasks required of the operators are:

Start seedlings in trays and transplant to the unit when ready

Remove twigs and leaves from collection bin.

Check nutrient supply and replenish if low or empty.

Use test strips to check the quality of the water in the tanks; add pathogen-eliminating solutions such as iodine as needed.

Harvest food as it matures. Greens can be trimmed at the 3" height, cherry tomatoes can be picked as they are ready, and the plants will continue to re-grow and produce food for months at a time.

The proposed unit greatly simplifies the process of collecting rainwater and making it potable. It does so where wells are not feasible or not affordable. That one benefit alone can change the health outcomes of a multitude of people. We believe that the proposed unit will be of significant interest to the top NGOs and non-profits of the world, and will be embraced as a solution in their missions.

The two greatest needs of humanity at this point in time are FOOD and WATER. This is according to the United National Food and Agriculture Organization (FAO.)

Our proposed unit can make an immediate and vital difference in the world today because it is easy to deliver, easy to set up, and easy to use. It provides a localized impact in both the food and water needs of the community.

Another key feature of our proposed solution is its ability to grow healthy organic food in an ongoing and reliable way. It produces a near-guaranteed output of food because they critical needs of the plant are addressed automatically. The plants receive natural organic nutrition in the correct amount, at the correct times, for the correct duration. No daily human intervention is needed.

The unit will definitely go through modifications, improvements and material changes as ongoing R&D proceeds. But the core basics of the unit will remain constant and will only get better and more efficient over time. Especially as we bring in industry consultants and engineers to implement their knowledge to the program over time.

A variant of this invention utilizes the basic water storage box component of the Rainwater Collection and Storage Unit, in a different configuration. In this variant, a variable number of these storage units are linked together as one flat layer on the ground. The units are all interconnected just as they are on each layer of the invention. But in this variation, no growing trays are attached to the units. Rather, the extension water collection tarpaulin (FIG. 8) will be placed directly over this single layer of tanks. The tarpaulin will collect rainwater and funnel it directly into the combined Storage Units. A separate rainwater purification model similar to that shown in the original invention, will be placed in a protected cabinet alongside the Storage Units. The water will circulate continuously and will be purified constantly using either or a combination of electric UV light purification, ozone purification, other electronic device purification, and known disease and pathogen killing chemicals such as iodine or bleach.

This combined array of tanks can be arranged in most any combination or array. The stored water can be easily accessed for use in a wide range of farm applications:

Drip irrigation of crops
Animal watering troughs
Drinking fountains for humans and pets
Cleaning and bathing animals
Cooking or canning vegetables and fruits The present invention, is directed to a modular rainwater collection and storage unit with integrated vegetable growing beds, which can be tailored and built from the mechanical concatenation of building module, which we term the basic water storage component 100.

Figure 2:
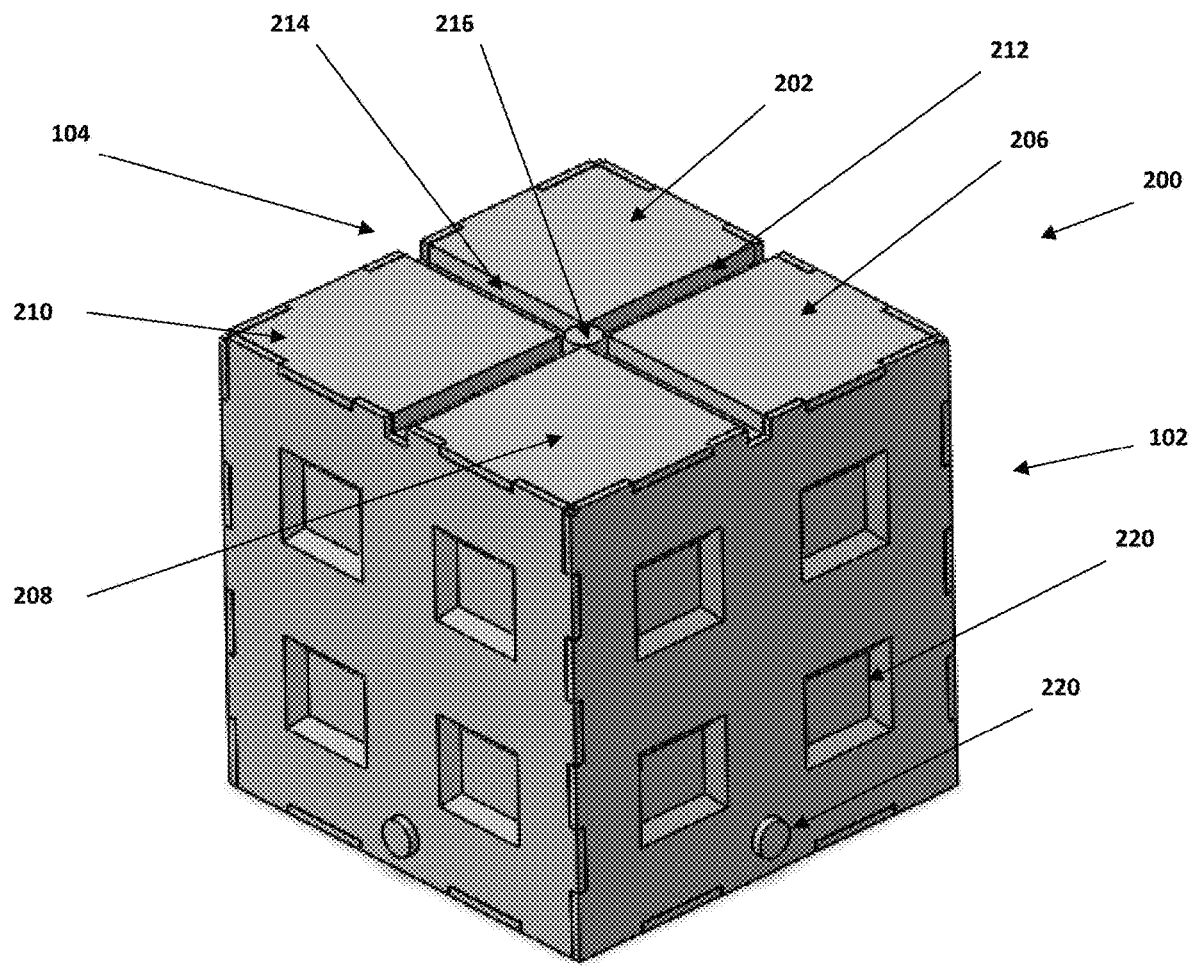
FIG. 2 shows a corner view of the assembled water storage box component, according to an exemplary embodiment of the invention.
Figure 3:
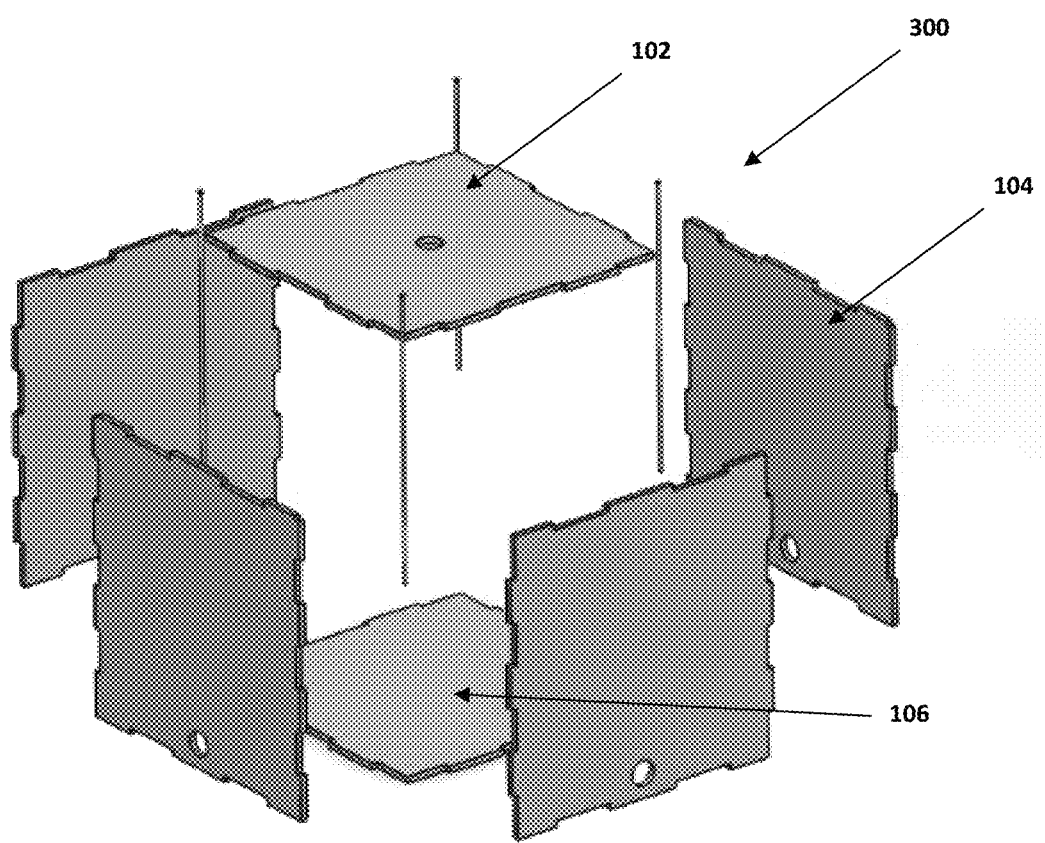
FIG. 3 shows a blow-up illustration of how flat panels are assembled to create the box component, according to an exemplary embodiment of the invention.

In one embodiment (FIGS. 1-3), such a building module 100 is comprised of four panels to form the walls 102, a panel for the top 104 and a panel for the bottom 106. In one embodiment, the walls/top/bottom interconnect to each other's neighboring edge (those between the walls vertically and between the bottom and walls horizontally at the bottom and the top and walls horizontally at the top, by forming a hinge, with complementary knuckles along the edges (e.g. 108/110) so that a hinge pin 112 joins them (e.g. said hinge pin may be a rod, wire, piano wire or similar with cotter pins or folded ends to hold them in place). Another mechanical solution would be a tongue and groove interleaved portions at the edges that 'Snap-on' together. In either case, when assembled, a rigid box 200 assembly is created with the edges of one wall/top/bottom being attached to its neighbor's edge.

Note that while a rectangular shape is embodied, alternate embodiments of three, five or more walls 104 may be realized, as long as the top/bottom 102/104 panels match. Similarly, although the panels 102/104/106 are shown as rectangular, any rectangle works, as long as the walls 104 match each other, and the top/bottom 102/106 does the same.

Note that the top 102 (FIG. 2) may be formed to have one or more lengthwise channels 212/214 to facilitate the mounting of other modules 100 and/or guide runoff water into the top opening 216 to the interior or the bladder 116 top opening 120. Similarly, the top 102 may form a slight indentation, so the water naturally runs into the opening 216 until the bladder fills, at which point it runs off the sides to any module 100 below. The indentations 220 provide structural strength. In an alternate embodiment 300, the top/sides/bottom panels 102/104/106 are flat.

Note that in other embodiments, the potential addition of locking clasps, cables or connectors may be used to maintain/increase the integrity and stability of the boxes. The plastic panels may have one or more optional holes 114 to accommodate water interconnection built into the fluid bladder 116, which is designed to fit into the assembled box 100 inner volume.

These water or fluid storage bladders 116 may be made of flexible plastic, and feature multiple intake/outtake water connections 118/120. In one embodiment the bottom of the bladder 116 has no opening, in others it has one with a flow restrictor. These water connections 118/120 may be directly interconnected through extension plugs and/or hoses 218 to the water connections 118/120 of other modules 102 to interconnect the water storage boxes together for the sharing and conveyance of the stored water.

Figure 7:
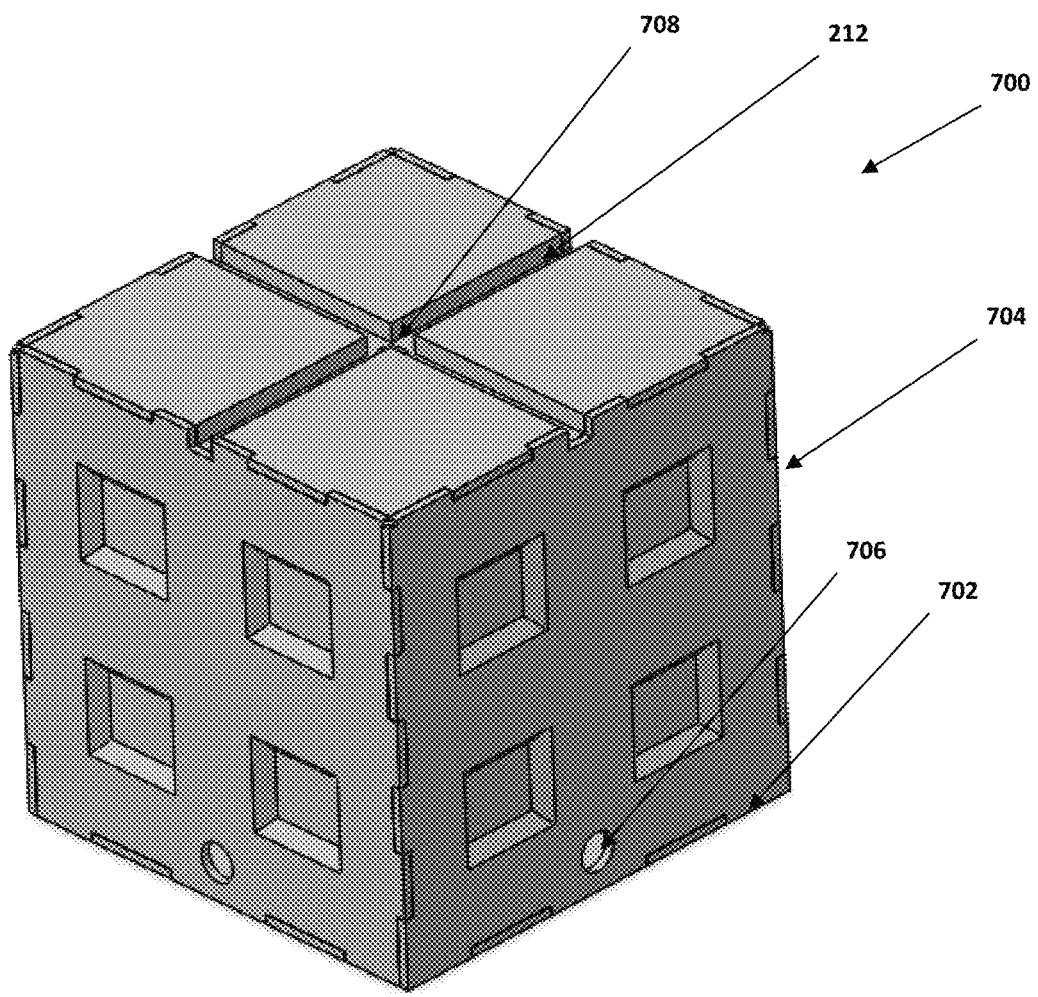
FIG. 7 shows a corner view of assembled water storage box component with no internal bladder but with flow control valves at the openings, according to an exemplary embodiment of the invention.

In an alternate embodiment (FIG. 7) the module 100 is provided with leak proof seams via the addition of chemical or mechanical components. One embodiment of this would be to apply a silicone sealant or Advanced Modified Polymer (AMP) sealant or similar adhesive sealing bead to the internal joints 108/112 of all the bottom 106 to walls 102 joints 702 around the bottom after the unit is assembled, and another bead along the vertical edges 704 as the walls are erected. The top may or may not have a sealing bead, but that is minimal, as any overflow simply goes into the lower tier or surrounding growth bed 420.

For potable water applications, these chemicals components can be food-safe, such as silicone (as well as for the bladder 116 and other components that touch the fluid and/or nozzles/hoses/restrictors) Note that similarly, the bladder may be an open top 'bag' that fits into the volume of the module 100. Plugs/Flow stoppers/caps/corks/spigots/faucets,/valves/Hoses/Flow stoppers/Flow restrictors can then be placed on the openings 706. In an alternate embodiment, the sealing may be accomplished by shaping the inside of said joints into water-resistant or water-proof shapes.

In another embodiment, plugs, flow stoppers, corks, caps, faucets, spigots, valves, hoses and/or similar fluid flow restrictors may be placed in one or more of the openings 118/120 in order to hydraulically connect the water modules to each other. In one embodiment, the hoses coming out of the openings 118 are drip irrigation hoses (having an opening where the plant root is). Note that the bottom 106 may be shaped flat in one embodiment, but in another it is shaved as a reverse of the top 104.

The indentations allow for the individual modules 102 to be stacked so as to form a rainwater collection and storage unit 400 (FIGS. 4-5) formed of two or more levels. At the first level, one module 402 can be placed on top of four other modules 404/406/408 (plus the one in the back at the same level), so that one lower corner of the upper module 402 covers a corner 202 of each of the four modules 102 below.

The above creates a stable platform at each level, leaving three panels in every corner 206/208/210 uncovered, and two panels for the modules 414/416/418 in the middle outside edges. The modules in the interior will have no exposed upper panels, but will contribute to the structural integrity of the assembly 400. Note that in other embodiments, the body of the structure 400 may be against a wall, with only the sides exposed.

Along the external edge of the exposed terraces 206/208/210, a wall/fence/barrier 410 may be placed, forming a growth bed 420. The barrier is semi-porous or porous, but enough 'leakage' will occur both at the joint between the top 102 and the fence 410 and through the channels 212/214 to prevent root rot.

The volume between the fence 410 and the inner module 100 (or modules at each level), forms a channel or growth bed 420, along which growing fill soil or a filler material used in the production of surgical gowns.

Known to the trade as Level 4 Medical Disposable Isolation Gowns, their fabric is often made from non-woven 1-ply spun bond and polyester fiber material. It is highly absorbent of liquids to protect the surgeon against microbial penetration. To meet this criteria the fabric must be 160 mm Hg fluid resistant and latex-free. One of the key features of these types of fabrics are that they soak up and hold liquids. When shredded and used as a filling material, it is an ideal substrate in which to grow plants or vegetables. During the fabric milling operation, many thousands of tons of waste material is generated, as the edges are trimmed neatly by sharp razor knives to give the fabric bolt clean edges. We believe that we can get one or more of the manufacturers to work with us to obtain these scraps at little to no cost. Our goal is to compress them into very tight sealed bricks—similar to the bricks of coffee that you find in the grocery store. The end user will open the sealed foil bag, place it in a 5-gallon pail and fill with water, to restore the fabric to a large water-retaining mass that will be placed in the unit's growing beds to grow crops.

The barrier 410 may also be plastic panels 410 or horizontal tanks 1000 that attach to the tops of the water storage tanks to form 'growing trays.' These growing trays are designed to accept dirt and/or a combination of dirt and animal manure, in which to grow plants.

In one embodiment, the wall 410 sections have plastic extrusion tabs at the bottom and sides that snap into the neighboring wall piece to form a solid wall, with the basic function these walls have is to hold the dirt inside the growing trays. The above will potentially have leaks along the connection, which we actually want in some cases.

Alternatively, these plastic panels may be water-storage tanks, which can be connected one to another using water-tight hoses, valves or other common connection devices. The plastic may be tinted black to capture the heating effects of the sun to warm the water inside the tanks/bladders 116. In one example, instead of a pyramid, a wall of modules 100 is created with thicker walls. The wall and corner sections in this variation are all actually water storage tanks. They connect using water tight fittings or pipes to form one large water tank per layer. All three layers of these water heating tanks will be interconnected and share a separate water purification and filtration system.

The water enters the tank through a connection from the unit's primary water system through a one-way valve. The valve prevents the hot water from back-flushing into the main potable water storage assemblage. When the black tanks are fully installed and filled with cold water, the sun will heat up the black plastic tanks and heat the water. All 3 layers of tanks are interconnected and the water is circulated and purified by a second processing unit. This system, on one single tower unit, will heat and store over 480 liters of water—giving our unit more than twice the capacity of your average 200 liters home heater.

A commercially-available portable shower unit can be placed nearby and fed with potable hot water from this "hot water tank" system, as well as cold water from the potable cold water side. Through this invention, we are in essence bringing the developing world the simple creature comforts afforded the rest of the world—hot water on demand for showers, cooking and cleaning. Very few of the people in the communities we will be serving with this invention will have ever experienced these luxuries before.

A water collection funnel 412 attaches to the top of the unit to capture rainwater and funnel it into the series of water storage boxes beneath it. Similarly, any rain that falls into the channels formed by the walls 410, will fall into the bladders 116 above via the channels 122 that lead into the openings on top 120 that feed the bladders 116. When the upper bladder within the block at level 502 is filled, the water overflows via channel 504 (on all four sides), into the top opening of all modules at level 506. Once these are filled, the water will overflow via the channels 508 into the modules at level 510, which upon filling overflow through channel sides at level 512, and successively. By closing the openings 514 at the bottom level 516, once the tanks are filled, the system operates passively. Any overflow (once the tanks at level 516 fill), drips over the side through channel openings 520.

In another embodiment, an extension water collection tarpaulin (FIG. 8) that is set up around the water collection funnel to increase its surface size to capture additional rainwater. This tarpaulin may be supported on its outer perimeters with tent poles that are held in place with ropes and tent stakes which pull the tarpaulin taut and help it to support the weight of the rainwater it receives.

The special rain collection tarpaulin may be attached to the outer edges of a water collection funnel 412. Said funnel 412 is hydraulically connected to the top of at least one water collection module, so that any water falling into it (whether collected from a tarpaulin 802 or from a hose coming from a pump, or hand-fed by a human from any container) goes into the hydraulic network of modules 100. In one embodiment, this tarpaulin extends to a size of 7 m×7 m square. A one meter opening in the center of the tarpaulin features hooks and/or magnets to hold the water exit frame in place on the unit. The tarpaulin will be made out of clear or translucent material to allow the sunlight to pass through to reach the plants.

For several meters out from the edges of the funnel and is supported on its corners by tent poles that are higher than the edges of the water collection funnel. This will engage gravity to direct the rainwater down the edges of the tarpaulin and into the funnel. Guide wires and tent stakes may be used to pull the assembled tarpaulin device upright and support it when filled with heavy rainwater.

In another embodiment, a water pumping, filtering and cleaning tank, which utilizes an electrically powered water pump that draws the water from one or more of the tanks within the bottom level 516. The water is brought to the top of the tower where it is passes through one or more filters or filtration units. Accommodations are made in the design of this tank to accept water purification compounds such as iodine, chlorine or other standard amoeba-killing chemicals, either manufactured or naturally occurring in nature.

Heating pads or plates to be inserted into the water storage boxes prior to inserting the water storage bladders. These heating units can be utilized to raise the water temperature above the freezing point in locations where freezing is possible given the local environmental conditions. In another embodiment, an electrical pump may be used to transfer this water out of the tanks and into a hose or pipe for attachment to a shower, laundry room, kitchen or other locations where warm/hot water is desired.

In another embodiment, a "water processing unit" (in place of the 402) tray module is placed at the top 502 level, and features a water cleaning/filtering/treatment tank that allows the system to remove debris from the water, as well as to add water cleaning chemicals or other additives to the water.

This unit also optionally features a nutrient/fertilizer mixing tank in which plant nutrients are added to the top holding tank, so that the fertilizing happens naturally as the water enters the system top 402 and flows downhill through the hydraulic network of modules 100 at the various levels 502/506/510/516. In another embodiment, this module 100 is places anywhere, and connected hydraulically to an electrically powered water pump that conveys the nutrient mixture into a drip irrigation system that disperses the nutrient mixture into the growing trays to water and feed the plants.

The key function of this chamber is to draw water from the tanks below, and mix it with the hydroponic nutrients in a very precise blend. A nutrient slurry is placed within the bladder 116 within the top module 402. At regular intervals, the slurry is released to the bladders below, where the properly blended nutrients and water mix is delivered to all of the plants in all three levels of growing trays.

Any active pumping component may include an optional electrical or electronic timer that turns the drip irrigation system on and off at specified times of the day, for user-selected increments of time.

We note that the panels 102/104/106 may be made of plastic, metal, pressed board, wood, or any other structurally sound material. They may be machined, injection molded, 3D printed or in any other suitable way. In one embodiment, the panels 102/104/106 may accommodate both water collection and heating components, and they may even be hollowed but filled with storage water displacement and control components (pumps, batteries, hoses, circuits, electronics, etc. in order to accomplish fluid displacement between and within the module's hydraulic connections network. In another embodiment, these fluid movement components (pumps, valves, sensors) are outside the modules.

The modules may be hydraulically connected to each other in at a number of ways. In one of them, the connection is through channel and gravity, where the water coming off a module's side opening 114 (either coming from the bladder's side opening 118 or from the inside of a sealed module 706) simply drips onto the top opening of the bladder 120 or a sealed module's 708) via the channels 212 or drip runoff. Or via hoses/drip hoses connecting two or more modules.

Note that in some embodiments, the pumping may be manual or electrical (including solar, batteries and others). We also note that whereas plastic bladders 116 are one component for holding water, other bladders and/or sealed tanks made of plastic or metal or other stable material in which the water is stored may be used.

Figure 4:
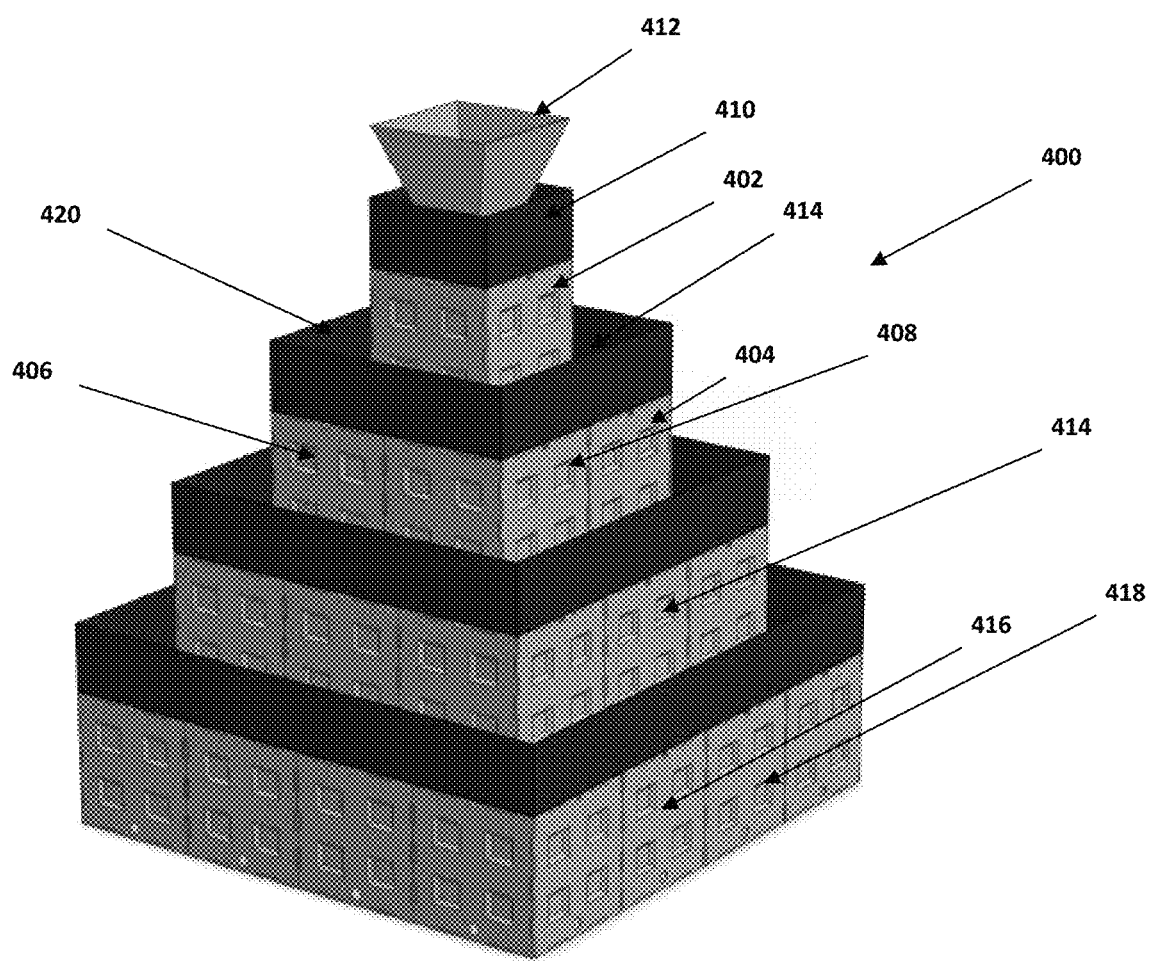
FIG. 4 shows a corner view of assembled Rainwater Collection and Storage Unit with Plant Growing Trays, according to an exemplary embodiment of the invention.
Figure 5:
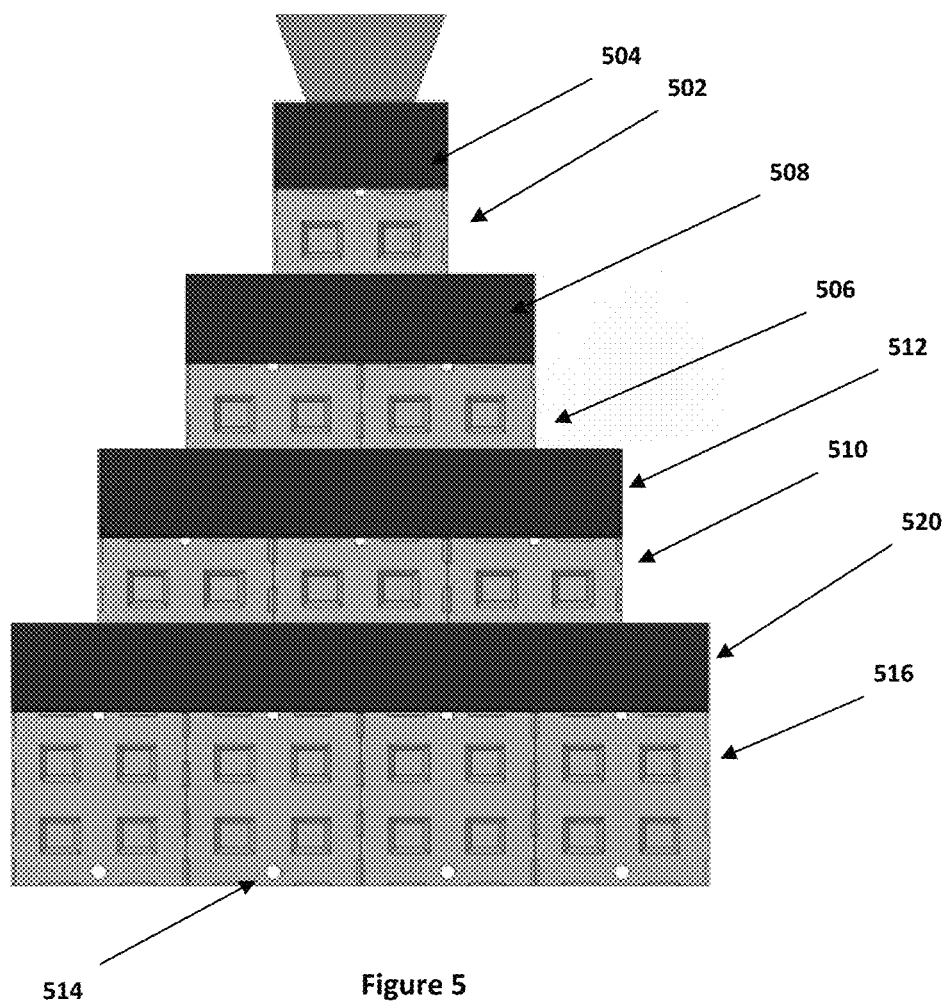
FIG. 5 shows a side view of the assembled Rainwater Collection and Storage Unit with Plant Growing Trays, according to an exemplary embodiment of the invention.
Figure 6:
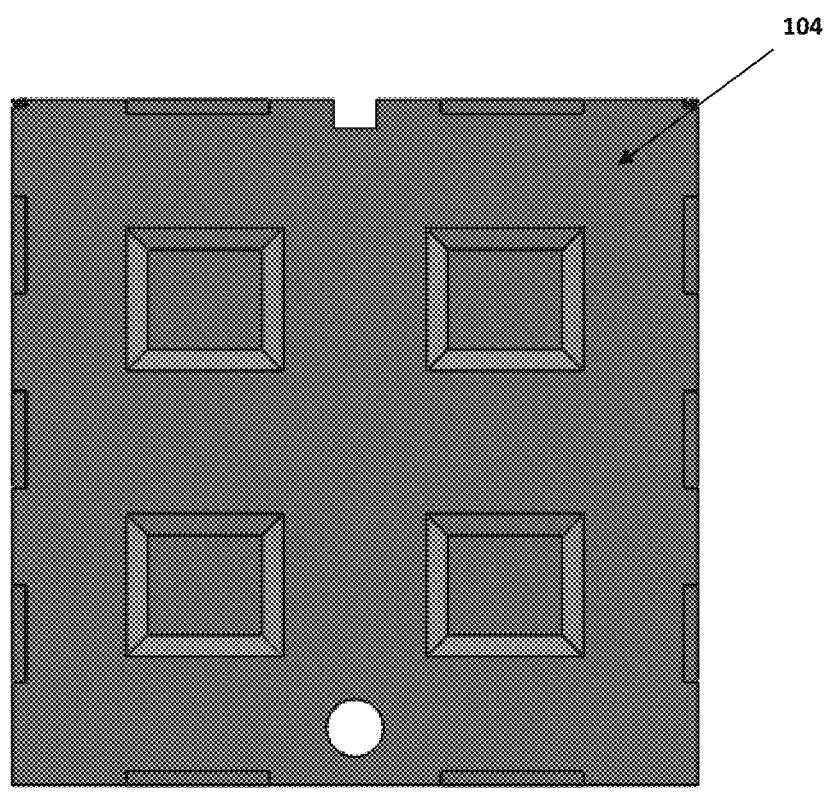
FIG. 6 shows a side view of the water storage box component, according to an exemplary embodiment of the invention.

As mentioned before, note that if you simply build the pyramid of FIGS. 4-5, and not include the planting, an effective water heating structure is accomplished if the modules are made of black walled 102/104/106 units with the bladder 116 nipples connected from box-to-box using small sections of collapsible water hose. Black plastic tanks are snapped into slots in the roofs of these Water Storage Boxes, to form a wall or chamber in which dirt is added to create a growing tray. These black plastic tanks are connected together using a water-tight connector, forming a ring of water heating tanks that receive heat from the sun to warm the water inside of them. All layers of black plastic tanks are interconnected to form a unified water heating tank that is accessed through a drainage portal located in the lower portions of the 516 layer.

In one embodiment, the outer edges of each panel 108/110 have an interconnecting tongue and groove feature. Also note that the outer edges of all panels have a circular hole emulating a standard piano hinge. A rod made of either metal or high-strength plastic, is inserted into two merged panels, locking them in place and providing side-to-side strength to contain the weight of the water to be stored in the water storage bladder 116 that goes inside of the Water Collection Box 102.

A significant advantage of the device is that all the components can be shipped flat (i.e., "knocked down" or "K.D.") for easy transport when stacked on a pallet. Also, due to the elements of this device being made of semi-flexible plastic (most likely plastic number 5 or PP plastic/polypropylene), these pallets when shrink-wrapped to hold the items together, can likely be air-lifted and dropped from delivery helicopters in areas with limited road access. In yet another embodiment, the actual panels 102/104/106 may be locally fabricated using local 3D printing.

A water purification assembly can also be envisioned, where a manual debris removal screen; think of a swimming pool filter that captures leaves, twigs, bugs, etc. is provided on at the top entry 412, and a water purification method (UV light, Ozone, etc.) is fitted to the top chamber 402, and tubing is connected so that only water from a bladder above is allowed to enter any bladders below, ensuring that all water in the structure 400 came through said purifier.

Figure 8:
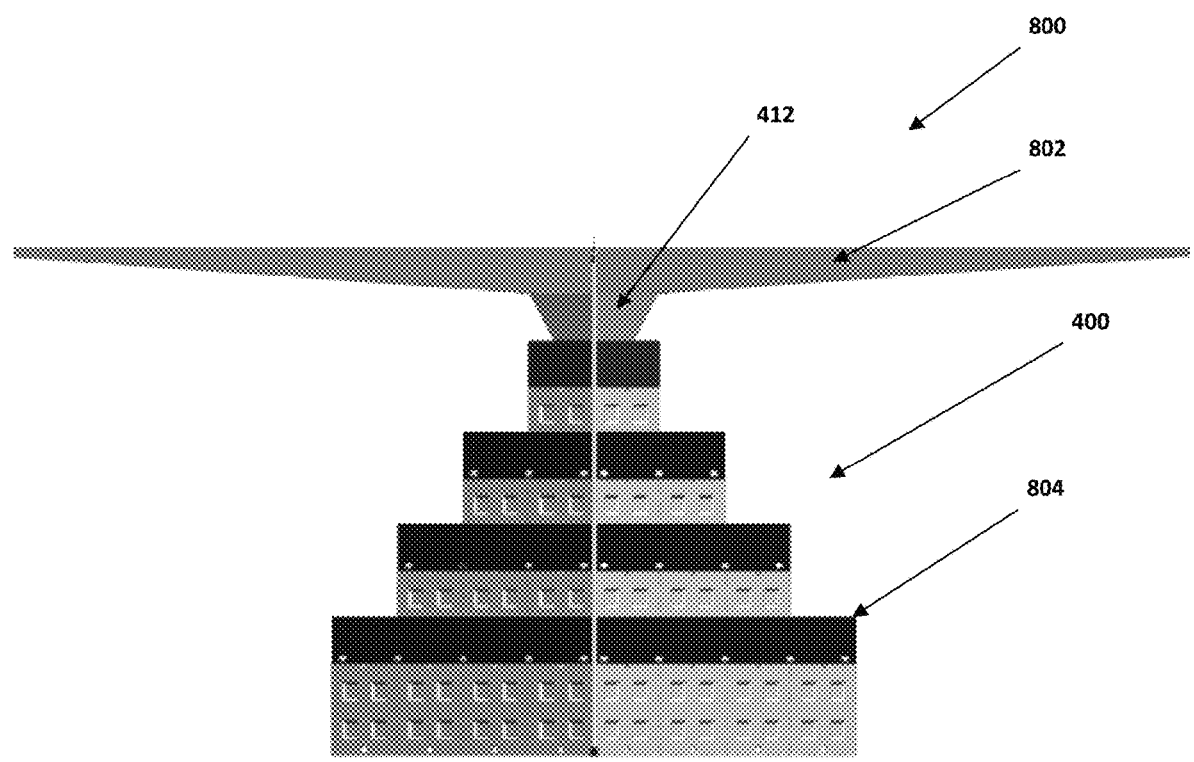
FIGS. 8-9 show a side and isometric view of an assembled Rainwater Collection and Storage Unit with an assembled rainwater collection and concentration tarp.
Figure 9:
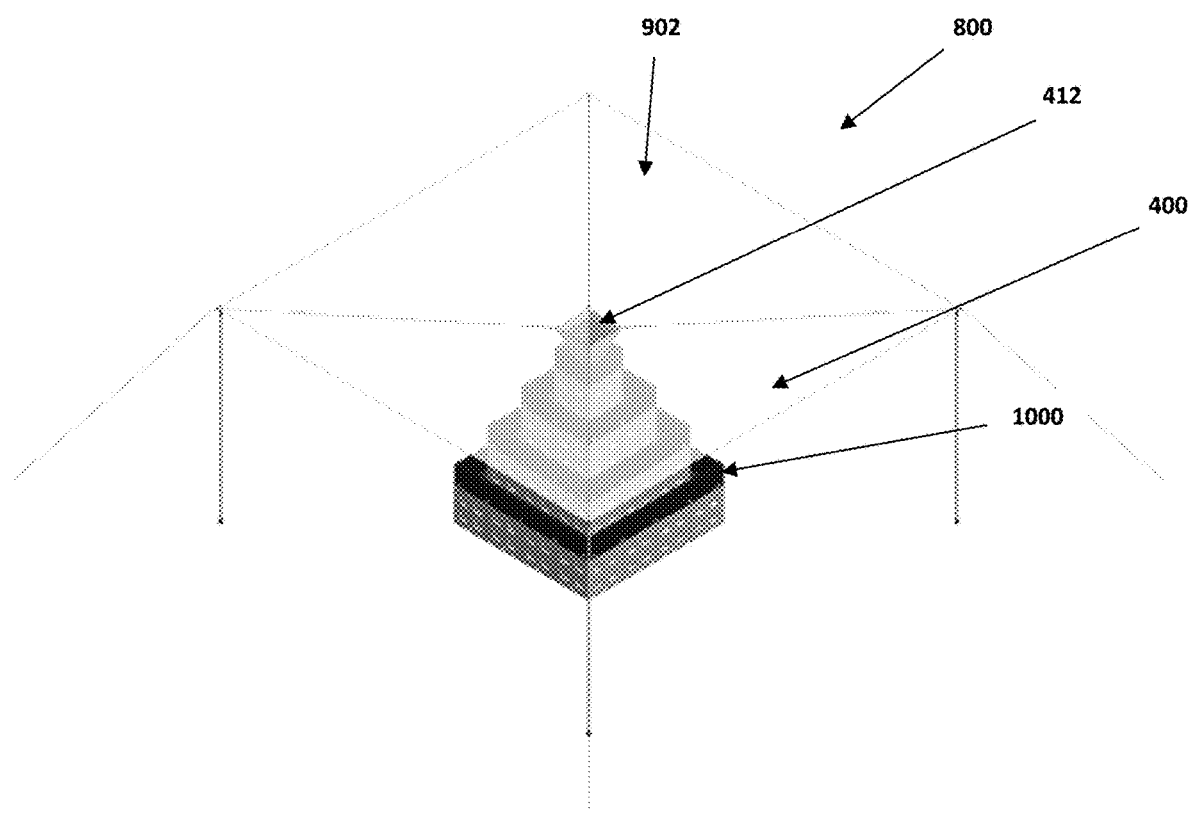
Figure 10:
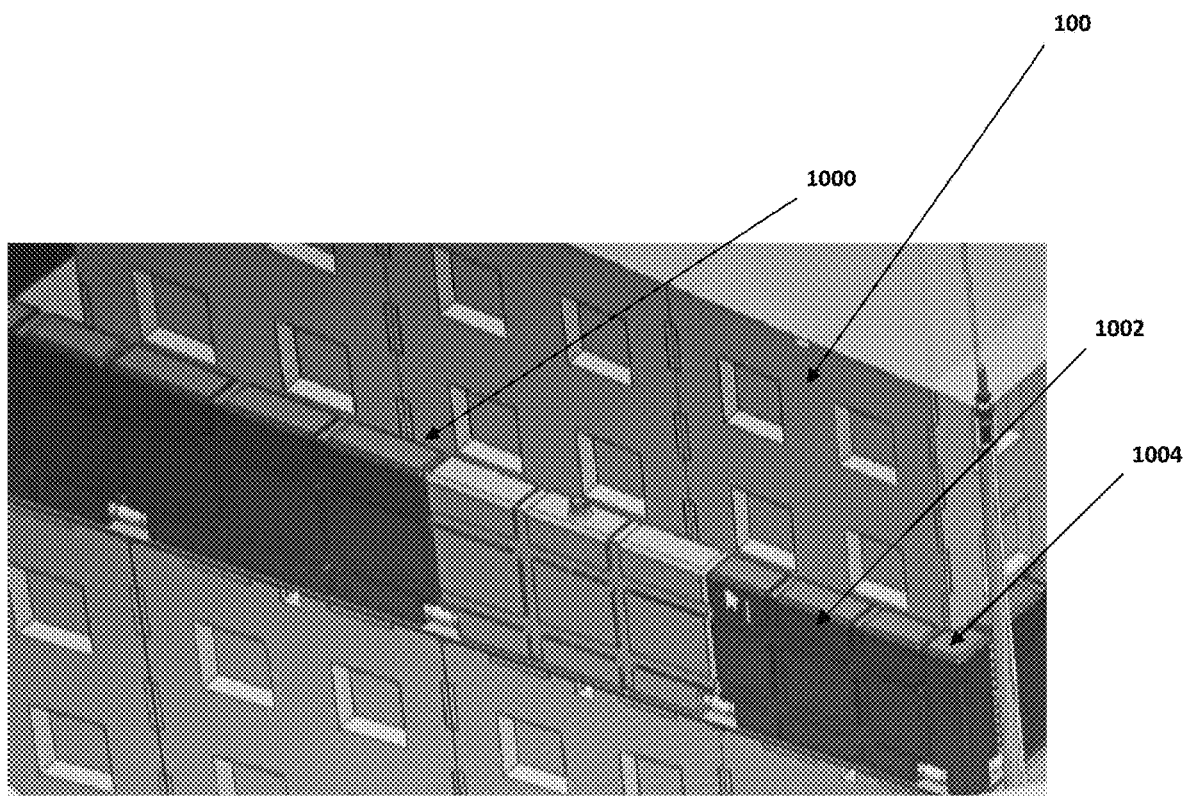
FIG. 10 shows a view of a proposed water heating wall, according to an exemplary embodiment of the invention.

FIGS. 8-9 illustrate 800 an embodiment of the optional rainwater collection and concentration tarp 802 placed over the collection unit 400. Covering one or more quarters 902 of the surface area, the unit proceeds to concentrate the water into the collection funnel 412. The tarp 802 may be transparent or semi-transparent (in order to provide the cultivated plants the optimal light frequencies.

In a further embodiment 1000 (FIGS. 10, 12-17) one or more special modules 1002/1004/1302, themselves fluid tanks, are placed as a retaining wall 1000 (such as 504/508/512/520 in 500), around any collection structure 402/404/414/416 as a separate row/rim of the growing area/bed 420) and connected by hoses or connectors 1602. Through separate connections of pumps, this water may be pure (non-agricultural) rainwater collection (i.e. a water heater) and/or part of the agricultural hydraulic connections (hoses, connectors, PVC tubes, etc.) of 400.

Figure 11:
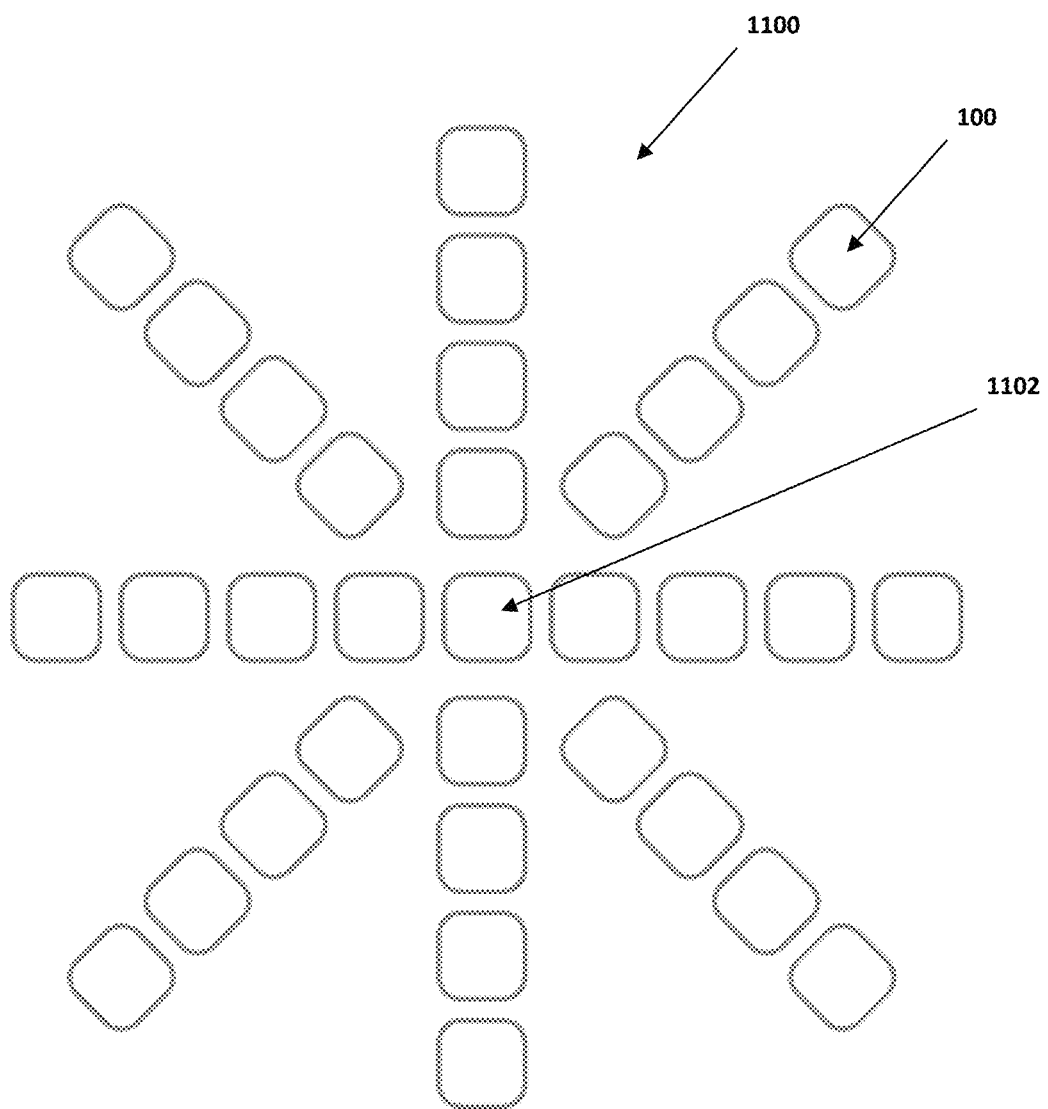
FIG. 11 shows a top view of a proposed water heating layout, according to an exemplary embodiment of the invention.
Figure 12:
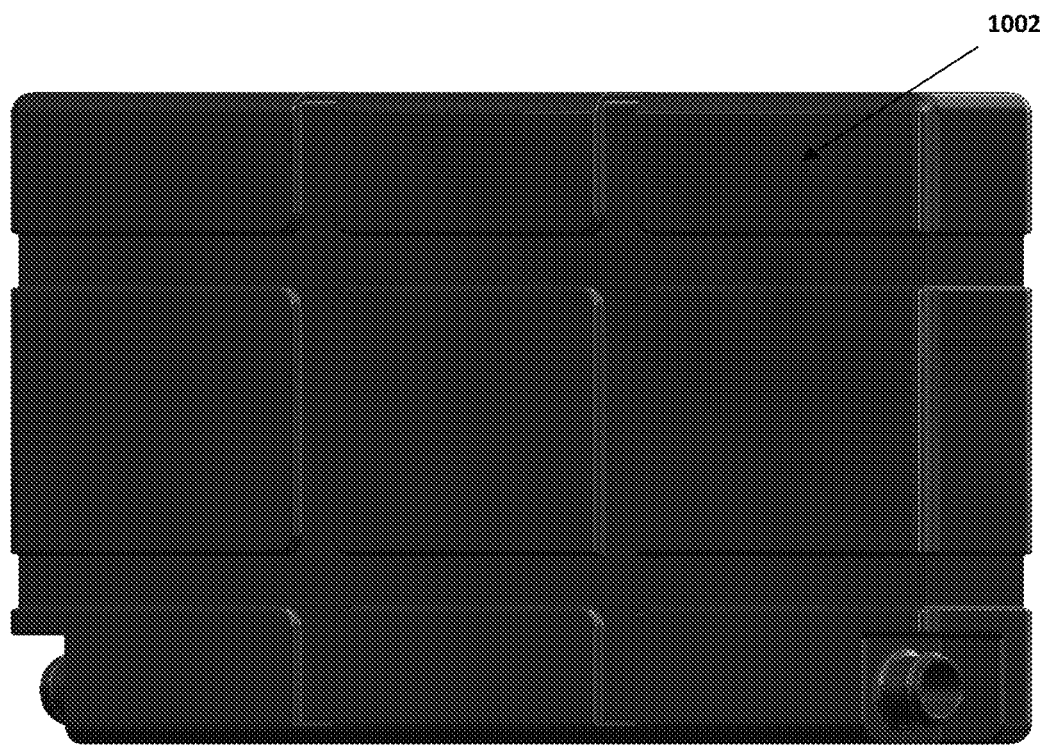
FIGS. 12-15 and 17 show perspective views of Snap-on water modules, according to an exemplary embodiment of the invention.
Figure 13:
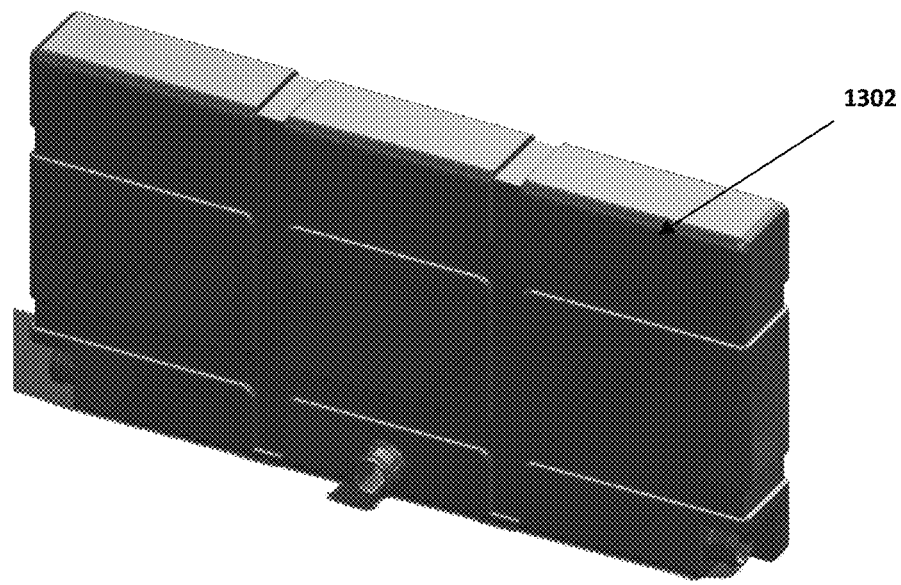
Figure 14:
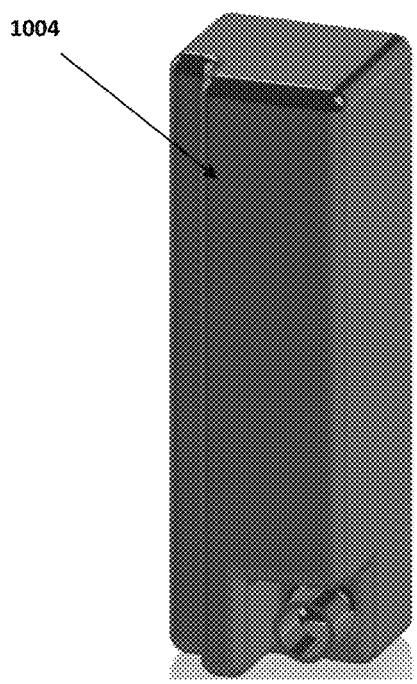
Figure 15:
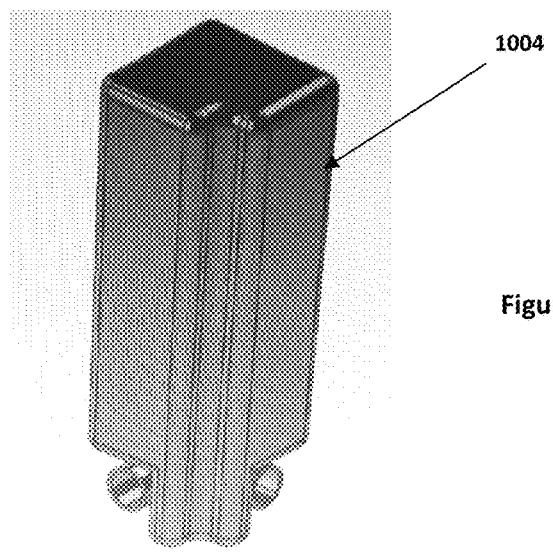
Figure 16:
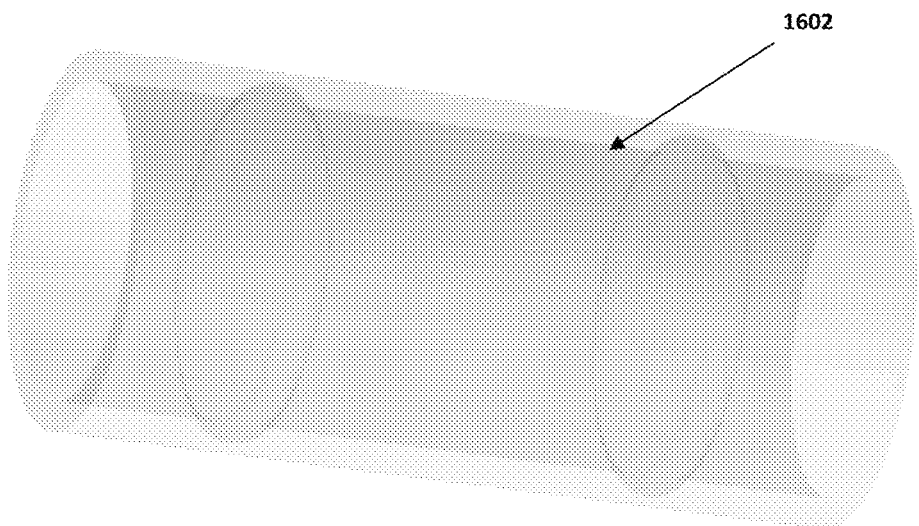
FIG. 16 shows a connector tube between modules, according to an exemplary embodiment of the invention.
Figure 17:
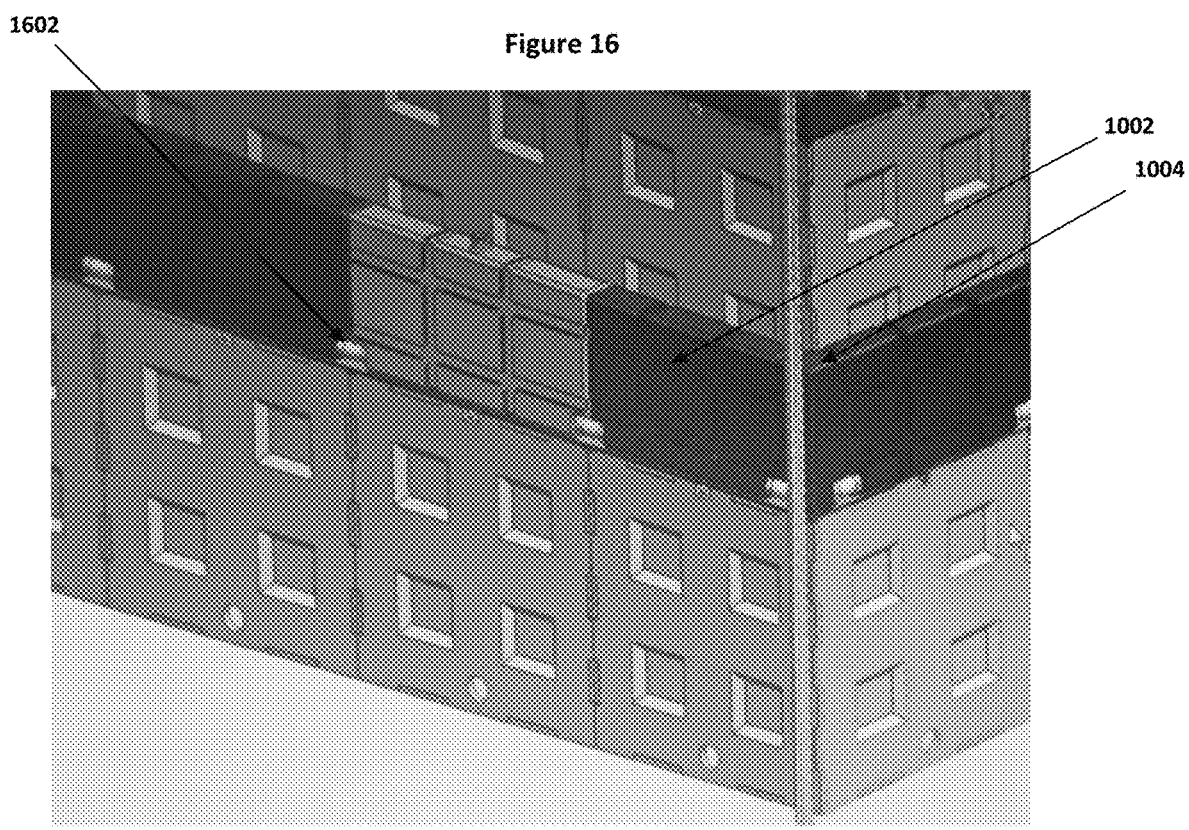

Similarly, (FIG. 11), these may be laid out 1100 within any area (as either a water tank or water heater) and interconnected for both filling and emptying, with an optional central unit as a pump unit 1102 (or any other suitable one). Note that the modules 100 may be square as shown, or made hexagonal or octagonal, so as to maximize the area's use.

To give one example, if in 1000 the module 100 walls/top/bottom 102/104/106 are 30 cm by 30 cm squares, forming a 30 cm cubes, with walls that are 2.54 cm, a total of 33 tanks are placed on a single layer on the ground. A clear plastic tarpaulin 7 m by 7 m in size covers it, and is hung in a downward configuration from tent poles. In this configuration, we are storing over 7,270 liters of rainwater. This unit would be ideal for watering cattle and other livestock that are located in remote farm land that is not near a public water supply system.

EXAMPLE

As an example, (FIGS. 4-5) the water storage module 100, when completely assembled with water storage bladder 116 inside the box, will have standard male garden hose connectors on all openings 118/120. These connectors are hooked to either other water storage boxes OR to water faucets for draining the water OR water blocking caps OR to water hoses for conveyance to other outside locations OR to water hoses that are used to water the plants in the plant growing trays. The water storage boxes are stacked side by side, with 16 individual boxes on the 516 level, nine additional boxes are stacked on the 510 level, four at the 506 level and one module 100 at the 502 level. The water collection funnel 412 begins the process.

The multiple modules 102 at the 506, 510, 516 and other such levels may be interconnected to the others at the same level, as well as to those at upper levels (either through gravity and/or the overflow of the channels 504, 508, 512, 520).

Conclusion

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A water collecting module comprising:
   a bottom panel, a top panel and four or more wall panels;
   wherein each said panel has edge mechanical components that are complementary to those of their neighboring panel's edge, so as to form a contiguous solid edge;
   said panel edge mechanical components are comprised of one or more of: hinge knuckles secured by a hinge pin, Snap-on edges;
   each said top panel has one or more openings;
   one or more of said wall panels has one or more openings;
   a bladder conformal to said module's inside volume having dimensions that match those of said individual bottom, top and wall panels;
   wherein said bladder has at least one opening coaxial to one or more openings located on said top panel; and
   at least one opening coaxial with the opening on at least one said wall panel.

2. The water collecting module of claim 1 wherein:
   at least one said bladder opening has a plug, cap, hose, flow restrictor, drip hose, faucet, valve or spigot.

3. The water collecting module of claim 1 wherein:
   said module internal horizontal and vertical edges are made leak proof via the addition of mechanical or chemical components, forming a fluid holding internal volume;
   wherein said edge leak proof mechanical component include one of:
   silicone gel, AMP sealing or silicone model seals; and
   one or more of said top panel or said wall panels openings has a plug, cap, hose, flow restrictor, drip hose, faucet, valve or spigot.

4. A water collecting system comprising:
   two or more hydraulically connected water collecting modules, each said water collecting module comprised of:
   a bottom panel, a top panel and four or more wall panels wherein each said panel has edge mechanical components that are complementary to those of their neighboring panel's edge, so as to form a contiguous solid edge, each said top panel has one or more openings;
   one or more of said water collecting modules is equipped with am internal bladder conformal to each said water collecting module's inside volume individual bottom, top and wall panels;
   one or more of said wall panels has one or more openings;
   each said bladder has at least one opening coaxial to one or more openings located on each said water collecting module's wall panels;
   each said water collecting module's panel edge mechanical components are comprised of one or more of:
   hinge knuckles secured by a hinge pin, Snap-on edges; and
   a water collecting funnel, hydraulically connected to the top of one said water collecting module.

5. The water collecting system of claim 4 wherein:
   wherein each said water collecting module's bladder is hydraulically connected to at least one more water collecting module's bladder; and
   at least one said bladder opening has a plug, cap, hose, flow restrictor, drip hose, faucet, valve, or spigot.

6. The water collecting system of claim 5 wherein:
   one or more of said water collecting modules is placed on top of four or more other said water collecting modules, forming at least one terrace atop the lower modules; and
   a fence is placed around the external edge at least one said terrace, forming a growth bed with one or more drip connections to the hydraulic network formed between water collecting modules.

7. The water collecting system of claim 6 further comprising:
   a tarpaulin is placed over all or parts of said assembly and tilted so that any rain runoff off said tarpaulin falls into said water collecting funnel.

8. The water collecting system of claim 7 wherein;
   a fertilizer/nutrient mixing station is placed within the highest water collecting module in hydraulic connection to said water collecting module network.

9. The water collecting system of claim 8 wherein;
   one or more pumps is hydraulically connected to said water collecting module network.

10. The water collecting system of claim 7 wherein;
    both a fertilizer/nutrient mixing station and one or more pumps are connected to said water collecting module network.

11. The water collecting system of claim 4 wherein:
    one or more of said water collecting modules internal horizontal and vertical edges are made leak proof via the addition of mechanical or chemical components, forming a fluid holding internal volume;
    wherein said edge leak proof mechanical component include one of:
    silicone gel, AMP sealing or silicone model seals;
    wherein each said water collecting internal volume is hydraulically connected to at least one more other water collecting module's internal volume; and
    at least one or more of said water collecting module's top panel or said wall panels openings has a plug, cap, hose, flow restrictor, drip hose, faucet, valve, or spigot.

12. The water collecting system of claim 11 further comprising:
    a tarpaulin is placed over all or parts of said assembly and tilted so that any rain runoff off said tarpaulin falls into said water collecting funnel.

13. The water collecting system of claim 12 wherein;
    one or more pumps is hydraulically connected to said water collecting module network.

14. The water collecting system of claim 11 wherein:
one or more of said water collecting modules is placed on top of four or more other said water collecting modules, forming at least one terrace atop the lower modules; and
a fence is placed around the external edge at least one said terrace, forming a growth bed with one or more drip connections to the hydraulic network formed between water collecting modules.

15. The water collecting system of claim 14 further comprising:
a tarpaulin is placed over all or parts of said assembly and tilted so that any rain runoff off said tarpaulin falls into said water collecting funnel.

16. The water collecting system of claim 15 wherein;
a fertilizer/nutrient mixing station is placed within the highest water collecting module in hydraulic connection to said water collecting module network; and
one or more pumps is hydraulically connected to said water collecting module network.

\* \* \* \* \*